May 18, 1954  K. LUFT  2,679,010
INFRARED SPECTROPHOTOMETER
Filed July 18, 1949  2 Sheets-Sheet 1
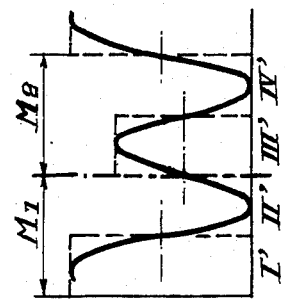
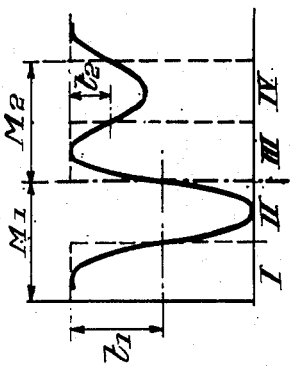
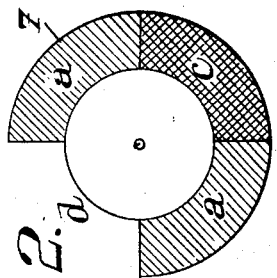
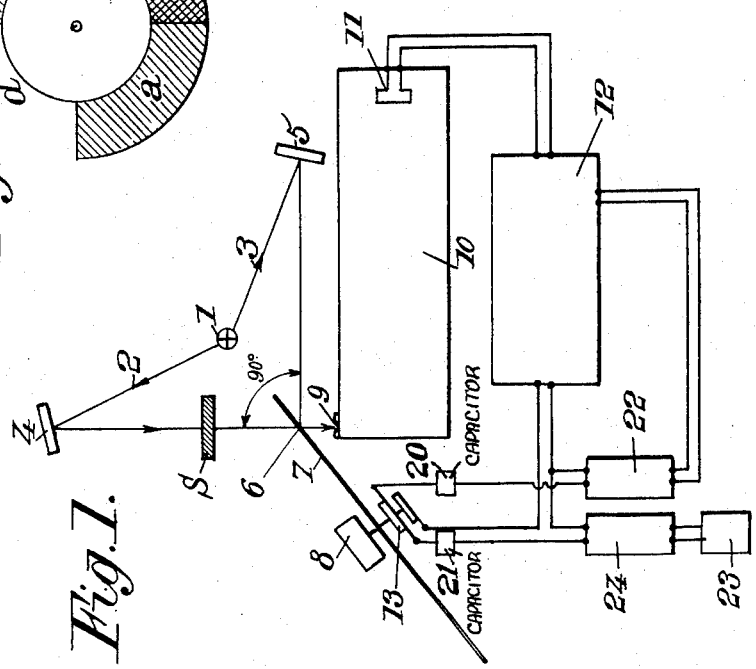
INVENTOR
KARL LUFT,
BY
Robert B Pierson
ATTORNEY Patented May 18, 1954

2,679,010

UNITED STATES PATENT OFFICE 2,679,010

INFRARED SPECTROPHOTOMETER

Karl Lüft, Toulouse, France, assignor to Office National d'Etudes & de Recherches Aeronautiques (O. N. E. R. A.), Paris, France, a society of France Application July 18, 1949, Serial No. 105,402

Claims priority, application France August 24, 1948

5 Claims. (Cl. 250—83.3)

1

The present invention relates to spectrophotometers intended to measure the transparency or opacity of a substance to light rays and particularly but not exclusively infra-red light rays.

Its object is to provide a spectrophotometer of this kind which is better adapted to meet the requirements of practice than those existing at the present time.

According to my invention, in a spectrophotometer the photo-sensitive or thermo-sensitive element of which is subjected to the action of rays from a light source, in particular an infra-red source, in such manner as to produce recurrently a period of exposure to rays having passed through the substance to be examined, a period of exposure to rays direct from said source, a period of darkening and a repetition of one of the above cited periods, I decompose the modulated voltage thus obtained into two impulses, the maximum amplitude of one of which (hereinafter called "comparison impulse") corresponds to the intensity of the light rays direct from the source and the maximum amplitude of the other (hereinafter called "measurement impulse") corresponds to the intensity of the rays that have passed through the substance to be examined or to the difference between these two intensities, and I provide means for indicating the ratio of these two amplitudes to each other.

A second feature of my invention consists in providing two capacitors which are charged to the peak voltages of the two rectified impulses resulting from the decomposition of the initial modulated voltage and the charge voltages of which, after amplification, serve to control a suitable instrument or apparatus.

Preferred embodiments of the present invention will be hereinafter described with reference to the accompanying drawings, given merely by way of example and in which:

Fig. 1 diagrammatically shows a spectrophotometer made according to my invention;

Fig. 2 shows a detail of the spectrophotometer of Fig. 1;

Figs. 3 and 4 show two curves corresponding to two different methods of operation;

Figure 5:
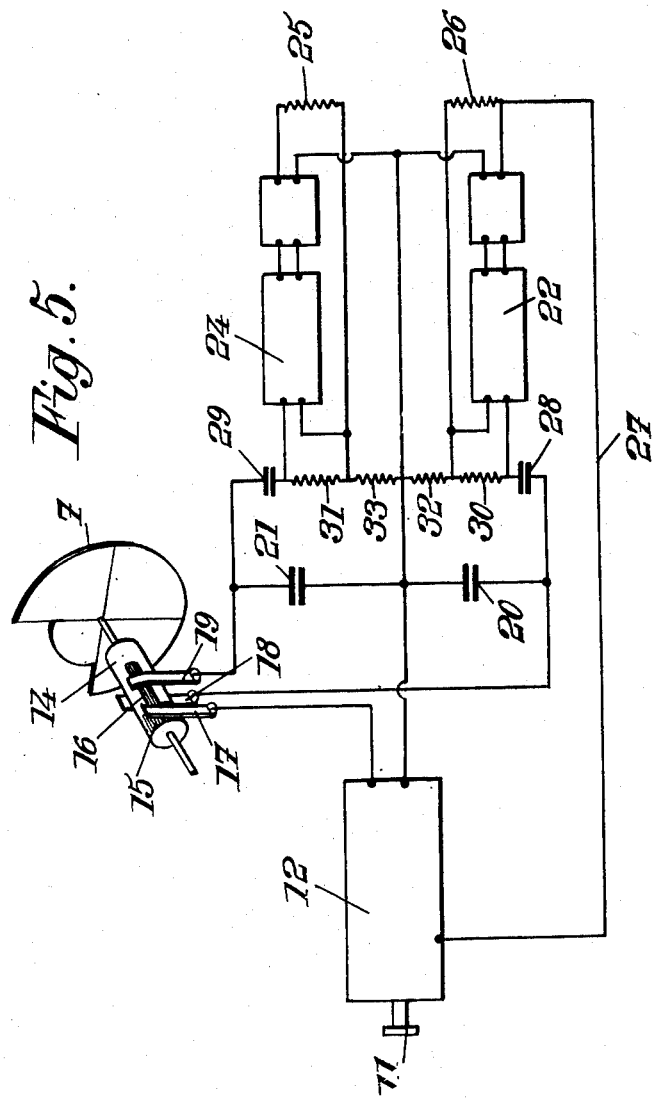
Fig. 5 is the lay-out of a device for decomposing the initial modulated voltage and for amplifying and utilizing the impulses obtained from this decomposition.

According to my invention, a spectrophotometer intended to measure the opacity or transparency of a substance, in particular to infra-red light, is based on the following principle.

A photo-sensitive or thermo-sensitive element

2 is exposed to the action of rays emitted by a source of infra-red rays, according to a cycle including a period of exposure to rays having passed through the substance to be examined, these rays being called "measurement" rays, a period of exposure to rays direct from said source, these rays being called "comparison" rays, a period of darkening and finally a repetition of one of the above cited periods.

Thus the photo-sensitive or thermo-sensitive element supplies a modulated voltage which, after amplification, is decomposed into two impulses one of which corresponds to the intensity of the measurement rays and, consequently, can be called "measurement impulse" while the other corresponds to the intensity of the comparison rays and, consequently, can be called "comparison impulse."

These two impulses, preferably after amplification thereof, are fed to means capable of indicating the ratio of their maximum amplitudes. This indication directly supplies the coefficient of transparency or of absorption, for the light rays employed, of the substance that has been examined.

Of course this principle can be carried out in many different ways. The cycles used when exposing the photo-sensitive or thermo-sensitive element to the action of the light rays, are different depending on whether it is desired to measure the transparency or the opacity of the substance to be examined.

If it is desired to measure transparency, the cycle according to which the photo-sensitive or thermo-sensitive element is exposed advantageously includes the following successive periods:

1. Exposure to the comparison rays (rays that have not been weakened by passing through the substance to be examined).
2. Darkening.
3. Exposure to the measurement rays (rays that have passed through the substance that is being examined).
4. Darkening.

When it is desired to measure opacity, the cycle advantageously includes the following periods:

1. Exposure to the comparison rays.
2. Darkening.
3. Exposure to the comparison rays.
4. Exposure to the measurement rays.

It is this last mentioned case which, by way of example, is illustrated by Figs. 1 and 2. The light rays emitted by a source 1 of infra-red light and travelling in the direction of arrows 2 and 3 in two different directions are reflected by two mirrors 4 and 5 so as to meet each other, at an angle of 90°, at a point 6. The measurement rays, which travel along path 2 and are reflected by mirror 4, pass through the substance S the opacity of which is to be examined, before reaching intersection point 6, and are thus partly absorbed, whereas the comparison rays, which travel along path 3 and are reflected by mirror 5, reach the intersection point without having been weakened.

Point 6 is located in the plane of a rotary circular disc 7 which divides said angle of 90° into two equal portions and which is for instance driven by means of an electric motor 8, through a speed reducing gear not shown. This disc includes four sectors of 90°. Two of these sectors are constituted by mirrors $a$ capable of reflecting the comparison rays at 90°, a third sector $c$ is blackened, while the fourth sector $d$ is constituted by a gap or by a transparent element through which the measurement rays 2 can pass freely.

The comparison and measurement rays strike the entrance slit of a monochromator 10 of conventional design, for instance a Littrow monochromator, including a photo-sensitive or thermo-sensitive element 11, for instance a thermo-pile which is acted upon successively by the various wavelengths of the rays that strike entrance slot 9.

It will be seen that disc 7, made as above mentioned and as illustrated by Fig. 2, works according to the second cycle above referred to, which permits of measuring the opacity of the substance S to be examined.

The voltage modulation supplied by element 11 is represented by the curve of Fig. 3, in which the four successive periods of the cycle are indicated by numerals I, II, III and IV.

If element 11 had been subjected to an action according to the first of the two said cycles, corresponding to the measurement of transparency, the voltage modulation would have been then represented by the curve of Fig. 4, in which the four periods which constitute this cycle are indicated by I′, II′, III′, and IV′.

The voltage thus modulated is, in the device shown by Fig. 1, first amplified in amplifier 12 and then decomposed into two partial voltage modulations $M^1$, $M^2$. Modulation $M^1$ is the comparison impulse modulation whereas modulation $M^2$ is the measurement impulse modulation.

In order to detect the two partial voltages obtained by the decomposition, according to another feature of the invention, I rectify each of the impulses obtained by this decomposition and I charge two capacitors with the peak voltages of these rectified impulses. I thus avoid the disturbing modulation of the two corresponding direct voltages.

I advantageously make use of a switch 13 controlled in any suitable manner, for instance by means of a photo-electric cell or, advantageously, by means of a mechanical device.

This switch 13, operatively connected with disc 7, is for instance made as shown by Fig. 5. It is constituted by a drum 14 on the cylindrical surface of which is fixed a closed contact ring 15, with a longitudinal narrow extension strip 16 parallel to the axis of the drum.

A brush 17 connected with one of the output terminals of amplifier 12 is constantly in contact with ring 15, whereas two brushes 18 and 19, which bear upon drum 14 along two dimetrally opposed generatrices thereof, are alternately in contact, for a short time, with strip 16, when drum 14 is rotating with disc 7, brush 18 being connected with one of the electrodes of a capacitor 20, the other brush 19 being connected with one of the electrodes of a second capacitor 21, whereas the respective other electrodes of these two capacitors are both connected with the other output terminal of amplifier 12.

The position of strip 16 and brushes 18 and 19 with respect to disc 7 must be chosen in such manner that the capacitors are connected with the output of the amplifier just when the measurement and comparison impulses pass through their maximums.

Owing to this arrangement, I simultaneously obtain the desired decomposition into a measurement impulse corresponding to the partial voltage modulation $M^2$ and a measurement impulse corresponding to the partial voltage modulation $M^1$ (see Fig. 3), rectification of these impulses and the charging of condensers 20, 21 to the peak voltage indicated in Fig. 3 respectively by arrows $t^1$ and $t^2$. Of course, the time constants for the charging and discharging of condensers 20 and 21 must be chosen in such manner as to permit of charging the condensers to a value corresponding to the peak voltages of the impulses that are considered and for keeping at an at least approximately constant value the charge of the condensers between two consecutive charge impulses.

If the initial modulation is that shown by Fig. 3, the charging voltage of one of the capacitors corresponds to the difference between the measurement and comparison impulses, whereas the charging voltage of the other capacitor corresponds to the absolute value of the comparison impulse.

In order to indicate the ratio of these two charges to each other, I may proceed in various ways. According to an advantageous embodiment diagrammatically shown by Fig. 1, I make use of the comparison voltage that has served to charge one of the capacitors 20 or 21, after amplifying it in an amplifier 22, to control amplifier 12, in a manner analogous to fading control, so that the comparison voltage at the output of amplifier 12 remains constant whatever be the value of the light comparison impulse which acts upon photo-sensitive or thermo-sensitive element 11 and which is as a rule considerably variable according to the light wavelength which, in the monochromator, acts upon element 11. Furthermore, according to this embodiment, I obtain the value measurement voltage that has served to charge the other capacitor by means of a measurement instrument 23, after this last mentioned voltage has been amplified by an amplifier 24. Due to the fact that amplifier 12 is controlled by the comparison voltage, the indication of measurement instrument 23 immediately corresponds to the ratio of the two voltages and, consequently, to the opacity of the substance S to be examined.

According to another advantageous embodiment, the charging voltages of the two condensers 20 and 21, after they have been suitably amplified, are caused to act upon a ratio measurement instrument having for instance two crossed coils 25 and 26 (see Fig. 5), this instrument being analogous to those used for temperature measurements.

In this case, it may be desired to regulate amplifier 12 in accordance with the comparison voltage (see conductor 27 of Fig. 5) and this in particular when the values of the comparison impulses are variable inside wide limits.

Fig. 5 shows an arrangement of this kind, this figure further showing details of the connections between capacitors 20 and 21 and amplifiers 23 and 24 which are also advantageously used when the indication of the ratio of the respective comparison and measurement voltages is obtained by the mere control of amplifier 12, as indicated by Fig. 1.

As shown by Fig. 5, each of the capacitors 20 and 21 is connected with the input of its corresponding amplifiers 22 and 24 through the intermediate of capacitors 28, 29 of periodically variable capacity, of charge resistors 30 and 31 and of compensation resistors 32 and 33.

Capacitors 28, 29 serve to transform the direct voltage of capacitors 20 and 21 into a modulated alternating voltage which can be amplified by amplifiers 22 and 24. This is why the auxiliary frequency of variation of the capacity of capacitors 28, 29 must be much higher than the frequency of the modulation produced by the rotation of disc 7, which is equal to twice the number of revolutions of this disc. If, for instance, this number of revolutions is 6 and, consequently, the frequency of modulation obtained by this disc is equal to 12, the auxiliary frequency with which the capacity of capacitors 28 and 29 is to be periodically modified must average 1000.

In order to obtain the variation of the capacity of capacitors 28, 29, it is for instance possible to arrange one of the electrodes of each of these condensers in the form of a diaphragm, the two diaphragms of these two condensers being subjected, by means of a third common diaphragm, to periodical variations of pressure; in order to avoid the possibility of capacitors 28 and 29 reacting on the charge voltage of capacitors 20, 21, capacitors 28 and 29 must have a capacity much lower than that of capacitors 20 and 21.

When capacitor 21 is charged by means of a peak voltage corresponding to the measurement impulse, capacitor 29 is also charged by means of the same voltage through resistances 31 and 33. If resistance 31 is higher than the resistance to alternating currents of capacitor 29, for the auxiliary frequency that is considered, I obtain, across resistance 31, due to the periodical variation of the capacity, an alternating voltage of an amplitude $$v = \frac{C}{C} \cdot V$$

(V being equal to the charging voltage). This alternating voltage is amplified by amplifier 24; it is rectified and filtered. The rectified current flows through the resistance or coil 25 of the measurement instrument, and also through the compensation resistance 33. The voltage drop across resistance 33 is in a direction such that it acts in opposition to the charging voltage of condenser 21. If the amplification of amplifier 24, is sufficiently high, I obtain full compensation, which means that the voltage drop across resistance 25 corresponds fully to the charging voltage of capacitor 21, i. e. to the measurement impulse.

The same remarks apply also to the voltage drop across the second resistance or coil 26 of the ratio measuring instrument, which voltage drop corresponds to the charging voltage of condenser 20 or to the comparison impulse.

As the method according to the present invention is not a zero method, the coefficient of absorption (or of transparency) to be determined includes non-linear terms, due to the presence of amplifier 12. However, the method according to the invention has the great advantage of dispensing with the necessity of a light weakening device as is necessary in zero methods based upon optical compensation of two beams.

As an exactly defined light weakening by means of polarized light is not possible within the infrared range, due to the absorption of the substances that are used it would be necessary to employ screens the linearity of which is very difficult to obtain. Furthermore, the use of movable screens would limit the rapidity of measurements to an undesirable degree.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A device for measuring the transparency or opacity of a substance to infra-red rays which comprises, in combination, a thermo-electric element responsive to the action of infra-red rays, a source of such rays, optical switch means for directing rays from said source onto said thermo-electric element alternately through said substance and directly through a reference medium, said optical means being operative according to a four period cycle of recurrence including a period of passage of said rays through said substance, a period of passage directly through said reference medium, a cut-off period and the repetition of one of said periods, whereby a cyclic variation of the voltage at the output of said thermo-electric element is obtained, means operatively connected with said optical switch means for separately collecting from the output of said thermo-electric element electric charges proportional to the peak values of said output voltage during said first and second mentioned cycle periods respectively, and means for measuring the ratio of said respective charges.

2. A device for measuring the transparency or opacity of a substance to infra-red rays which comprises, in combination, a thermo-electric element responsive to the action of infra-red rays, a source of such rays, optical switch means for directing rays from said source onto said thermo-electric element alternately through said substance and directly through a reference medium, said optical means being operative according to a four period cycle of recurrence including a period of passage of said rays through said substance, a period of passage directly through said reference medium, a cut-off period and the repetition of one of said periods, whereby a cyclic variation of the voltage at the output of said thermo-electric element is obtained, an amplifier having its input connected with said thermo-electric element output, two capacitors, switch means operatively connected with said optical switch means for alternately connecting the output of said amplifier with said capacitors to charge them respectively only while the voltage supplied by said thermo-electric element output passes through peak values corresponding to the action on said element respectively of the rays direct from said source and of the rays having passed through said substance, said capacitors having discharge time constants higher than the period of the cycle of said optical means, and means connected with said capacitors for indicating the ratio of the respective charges thereof.

3. A device for measuring the transparency or opacity of a substance to infra-red rays which comprises, in combination, a thermo-electric element responsive to the action of infra-red rays, a source of such rays, optical switch means for directing rays from said source onto said thermo-electric element alternately through said substance and directly through a reference medium, said optical means being operative according to a four period cycle of recurrence including a period of passage of said rays through said substance, a period of passage directly through said reference medium, a cut-off period and the repetition of one of said periods, whereby a cyclic variation of the voltage at the output of said thermo-electric element is obtained, an amplifier having its input connected with said thermo-electric element output, two capacitors, switch means operatively connected with said optical switch means for alternately connecting the output of said amplifier with said capacitors to charge them respectively only while the voltage supplied by said thermo-electric element output passes through peak values corresponding to the action on said element respectively of the rays direct from said source and of the rays having passed through said substance, said capacitors having discharge time constants higher than the period of the cycle of said optical means, means between said amplifier and the capacitor corresponding to the action of the rays direct from said source to keep at a constant value the output voltage of said amplifier corresponding to the action of said rays direct from the source, and means for measuring the charge of the other capacitor.

4. A device for measuring the transparency or opacity of a substance to infra-red rays which comprises, in combination, a thermo-electric element responsive to the action of infra-red rays, a source of such rays, optical switch means for directing rays from said source onto said thermo-electric element alternately through said substance and directly through a reference medium, said optical means being operative according to a four period cycle of recurrence including a period of passage of said rays through said substance, a period of passage directly through said reference medium, a cut-off period and the repetition of one of said periods, whereby a cyclic variation of the voltage at the output of said thermo-electric element is obtained, an amplifier having its input connected with said thermo-electric element output, two capacitors, switch means operatively connected with said optical switch means for alternately connecting the output of said amplifier with said capacitors to charge them respectively only while the voltage supplied by said thermo-electric element output passes through peak values corresponding to the action on said element respectively of the rays direct from said source and of the rays having passed through said substance, said capacitors having discharge time constants higher than the period of the cycle of said optical means, means between said amplifier and the capacitor corresponding to the action of the rays direct from said source to keep at a constant value the output voltage of said amplifier corresponding to the action of said rays direct from the source, and an instrument having its input connected to these two capacitors for measuring the ratio of their respective charges.

5. A device for measuring the transparency or opacity of a substance to infra-red rays which comprises, in combination, a thermo-electric element responsive to the action of infra-red rays, a source of such rays, optical switch means for directing rays from said source onto said thermo-electric element alternately through said substance and directly through a reference medium, said optical means being operative according to a four period cycle of recurrence including a period of passage of said rays through said substance, a period of passage directly through said reference medium, a cut-off period and the repetition of one of said periods, whereby a cyclic variation of the voltage at the output of said thermo-electric element is obtained, an amplifier having its input connected with said thermo-electric element output, two capacitors, switch means operatively connected with said optical switch means for alternately connecting the output of said amplifier with said capacitors to charge them respectively only while the voltage supplied by said thermo-electric element ouput passes through peak values corresponding to the action on said element respectively of the rays direct from said source and of the rays having passed through said substance, said capacitors having discharge time constants higher than the period of the cycle of said optical means, means between said amplifier and the capacitor corresponding to the action of the rays direct from said source to keep at a constant value the output voltage of said amplifier corresponding to the action of said rays direct from the source, two amplifiers, means for discharging said two capacitors into the input circuits of said last mentioned amplifiers, respectively, each of said last mentioned means including a capacitor of periodically variable capacity for transforming the direct voltage supplied by each of the first mentioned capacitors into an alternating voltage, and means connected to the outputs of said last mentioned amplifiers for measuring the ratio to each other of their respective output voltages.

References Cited in the file of this patent

UNITED STATES PATENTS

| Number | Name | Date |
|---|---|---|
| 1,932,337 | Dowling | Oct. 24, 1933 |
| 2,326,878 | Muller | Aug. 17, 1943 |
| 2,442,910 | Thomson | June 8, 1948 |
| 2,451,572 | Moore | Oct. 19, 1948 |
| 2,474,098 | Dimmick | June 21, 1949 |
| 2,503,062 | Moriarty | Apr. 4, 1950 |
| 2,503,165 | Meyer | Apr. 4, 1950 |

FOREIGN PATENTS

| Number | Country | Date |
|---|---|---|
| 20,127 | Australia | Nov. 22, 1935 |
| 389,214 | Great Britain | Mar. 16, 1933 |
| 636,170 | Germany | Oct. 5, 1936 |

OTHER REFERENCES

General Electric Review, February 1947, pages 39–41, article by Moriarty.

An Automatic Recording Infra-Red Spectrophotometer, by W. S. Baird et al., Journal of the Optical Society of America, October 1947, pages 754–761.